United States Patent [19]

Acharya et al.

[11] Patent Number: 4,526,877
[45] Date of Patent: Jul. 2, 1985

[54] ATTRITION RESISTANT MOLECULAR SIEVE

[75] Inventors: Arun Acharya, East Amherst; William E. BeVier, Kenmore, both of N.Y.

[73] Assignee: Union Carbide Corporation, Danbury, Conn.

[21] Appl. No.: 655,581

[22] Filed: Sep. 28, 1984

Related U.S. Application Data

[63] Continuation-in-part of Ser. No. 433,901, Oct. 12, 1982, abandoned.

[51] Int. Cl.³ .............................................. B01J 20/18
[52] U.S. Cl. .......................................... 502/60; 502/62
[58] Field of Search ................................... 502/60, 62

[56]  References Cited

U.S. PATENT DOCUMENTS

| 1,524,843 | 2/1925 | Ruprecht | 502/62 |
|---|---|---|---|
| 2,671,644 | 3/1954 | Zenner et al. | 257/6 |
| 2,736,689 | 2/1956 | Stuart | 502/62 X |
| 2,841,368 | 7/1958 | Zenner et al. | 257/6 |
| 2,885,368 | 5/1959 | Hess et al. | 502/62 X |
| 2,976,253 | 3/1961 | Edwards | 252/430 |
| 3,194,754 | 7/1965 | Fahnestock | 266/120 |
| 3,276,993 | 10/1966 | Reid | 208/120 |
| 3,746,665 | 7/1973 | Urbanic | 252/430 |
| 4,024,229 | 5/1977 | Smith et al. | 423/562 |
| 4,183,980 | 1/1980 | Nielsen | 427/215 |
| 4,214,011 | 7/1980 | Strube | 426/591 |
| 4,225,531 | 9/1980 | Jones et al. | 260/449.6 R |
| 4,333,857 | 6/1982 | Lim et al. | 252/455 |

FOREIGN PATENT DOCUMENTS

| 907292 | 8/1972 | Canada | 23/339 |
|---|---|---|---|
| 103530 | 6/1978 | Poland | 33/26 |

OTHER PUBLICATIONS

Basic Lubrication Practice, by Brewer, Reinhold Publishing Corp., N.Y., 1955, pp. 274–277.

Ejsymont et al, Granulation of Zeolite 13X by Pressing with Substances that Reduce the Friction, Prace Chemiczne, vol. 23, pp. 173–187, 1978.

*Primary Examiner*—Carl F. Dees
*Attorney, Agent, or Firm*—Stanley Ktorides

[57]  ABSTRACT

An attrition resistant molecular sieve composition comprising a generally spherical, high porosity molecular sieve particle having an exposed surface coated with a thin, generally uniform layer of solid lubricant which can be employed in fixed, moving or fluidized beds with low attrition and without significantly reduced activity.

21 Claims, 4 Drawing Figures

ATTRITION RESISTANT MOLECULAR SIEVE

This application is a continuation-in-part of copending application, Ser. No. 433,901 now abandoned, filed Oct. 12, 1982.

TECHNICAL FIELD

This invention relates generally to molecular sieves and more particularly to generally spherical, high porosity, friable molecular sieves and their use in adsorbent beds.

BACKGROUND ART

An often used procedure of the chemical or physical alteration of material involves the passage of such material through a bed of adsorbent, catalyst, etc. depending on the intended result. When a continuous process is employed, a packed bed presents certain problems. While is is desired to have short cycle times in order to minimize bed inventory and equipment size, longer cycle times are generally more energy efficient. Furthermore, there is a need for an elaborate and expensive valve assembly for cycling various streams among various beds, which can lead to increased maintenance costs. These operating problems become more acute as one tries to minimize capital expense by reducing cycle times. Those skilled in the art have long recognized the advantages of moving and fluidized beds over packed beds. Such advantages include a greater energy efficiency because of the reduction of cyclic and transient energy losses and because of higher product recoveries.

A problem with the use of certain adsorbent particles in adsorbent beds is attrition of the particle by abrasion of its surface. In fixed beds, fluid flow may cause adjacent particles to contact and abrade each other, especially when a localized portion or the entire bed is accidentally fluidized. Movement may also be caused by external forces such as vibrations due to nearby compressor or location of the bed on a moving vehicle. In moving and fluidized beds, the problem of attrition is magnified. Excessive particle attrition is caused, for example, by abrasion among bed particles, abrasion with bed walls and bed internals and distributor jet impingement and abrasion in circulation conduits to and from the bed. High particle attrition contributes to product contamination, particle loss, plugging of downstream equipment, high filtration costs, and unstable fluidization behaviour such as channeling, slugging or increased entrainment.

The problem of particle attrition is especially severe with high porosity bed particles such as molecular sieves. Molecular sieve beads or pellets consist essentially of zeolite crystals and a clay binder material. Due to the ceramic nature of both these materials, the surface is highly abrasive and subject to attrition. The amount of surface attrition caused by an impact on the particle depends on the particle's momentum, which is the product of its mass and its velocity. Therefore, smaller particles traveling at low speeds, i.e. in a bed having low fluidization velocity, do not suffer as much attrition as large, highly fluidized particles. The total amount of attrition, as measured by the amount of dust generated in the adsorbent bed, includes surface attrition and attrition due to the breaking up of the entire particle.

It has been possible to employ molecular sieves in fixed beds without excessive attrition. However, it has not generally been economical to use molecular sieves for moving beds, except in very specialized applications such as cracking petroleum fractions for gasoline. In this approach, very small molecular sieve particles made up of about 80% clay binder are formed. Molecular sieves employed in packed beds generally have only about 20% clay. The particles containing mostly clay have a higher crush strength, but a lower mass transfer efficiency, than the conventional molecular sieve particles. In catalytic cracking, the granular type particles are swept along by a carrier gas with which they react. The attrition experienced is somewhat less than that of particles containing 20% clay, and is nearly equal to the amount of sieve that must be replaced anyway due to loss of reactivity, so the attrition does not prevent the use of these particles in a moving bed. The slight reduction in total attrition is believed to be largely attributable to fewer particles becoming pulverized, as opposed to any significant difference in surface attrition of the "harder" particles.

Thus, the capability to employ molecular sieves in moving and fluidized beds while keeping attrition low without a significant reduction in efficiency would be highly desirable.

It is therefore an object of this invention to provide an attrition resistant molecular sieve.

It is another object of this invention to provide molecular sieves which can be employed in moving and fluidized beds while exhibiting low attrition and retaining high mass transfer or reactive capabilities.

It is another object of this invention to provide a method of treating generally spherical, high porosity, friable molecular sieve particles such that they can be employed in moving and fluidized beds while exhibiting low attrition and retaining high mass transfer or reactive capabilities.

SUMMARY OF THE INVENTION

The above and other objects which will become apparent to one skilled in the art upon a reading of this disclosure are attained by the present invention, one aspect of which comprises:

A composition comprising a generally spherical, friable, high porosity molecular sieve particle having an adherent surface comprising surface irregularities and, adhered to the exposed adherent surface of said particle, a thin, generally uniform coating of a solid lubricant in an amount of from about $1.0 \times 10^{-7}$ to $2.0 \times 10^{-3}$ gram per square centimeter of the projected surface area of said particle.

Another aspect of this invention comprises:

A process for rendering a generally spherical, high porosity, friable molecular sieve particle, having an adherent surface comprising surface irregularities, more resistant to attrition comprising applying dry lubricant to the exposed surface of said particle to adhere to said exposed surface a thin, generally uniform layer of a solid lubricant in an amount of from about $1.0 \times 10^{-7}$ to $2.0 \times 10^{-3}$ gram per square centimeter of the projected surface area of said particle.

As used herein, the term "high porosity" means a particle having a relatively large internal surface area which is directly accessible from the particle surface.

As used herein, the term "generally spherical" means a particle having rounded edges, i.e., of generally convex contour, without sharp corners or protruding sections susceptible to easy fracture. If an attempt were made to utilize friable particles with sharp corners or protruding sections in a moving or fluidized bed the jagged edges would soon become smooth by unavoidable attrition and the particles could then be called generally spherical. As such the term "generally spherical" is not meant to be limited to an ideal or nearly ideal spherical shape.

As used herein, the term "friable" means a material which experiences excessive attrition when subjected to repeated particle-to-particle or particle-to apparatus contact. Although the amount of attrition which is considered excessive may very depending on the specific application, a quantitative definition of friable may be a particle that experiences an estimated yearly weight loss of 10 percent or more in a fluidized bed at a bed expansion of about 2.0 when tested under the conditions described in Example 1, infra.

As used herein, the term "moving bed" means a system whereby dual component (such as gas and particle) contact is attained for reactive, transport, or exchange purposes while both components have spacial motion relative to the vessel containing them.

As used herin, the term "fluidized bed" means a moving bed in which the fluid drag force of the fluid component causes movement of the solid component from its repose position in a manner that enhances mixing of both components in the bed. The term, fluidized, is derived from the fluid-like characteristics, such as zero angle of repose, mobility, and a pressure head equal to the bulk density of the bed, which the bed assumes.

As used herein, the term "fixed bed" means an adsorbent bed in which the adsorbent particles are not designed to undergo net travel relative to the vessel containing them. The adsorbent particles may move slightly in a localized area due to the force of fluid flow through the bed or external forces such as vibrations.

As used herein, the term "adsorbent bed" means a collection of adsorbent particles in close proximity to each other and configured such that it is able to be contacted by a fluid.

As used herein, the terms "external surface" and "external surface area" mean the outer surface of a particle as it is apparent to the naked eye. A stylistic representation of the external surface of a particle may be seen in FIG. 4.

As used herein, the terms "projected surface" and "projected surface area" mean the smoothed out external surface area. A stylistic representation of the projected surface of a particle may be seen in FIG. 4.

As used herein, the terms "exposed surface" and "exposed surface area" mean the projected surface area less any portion not substantially coincident with the external surface area, i.e., that portion of the particle that is likely to come in contact with other particles or equipment. A stylistic repPesentation of the exposed surface of a particle may be seen in FIG. 4.

As used herein, the terms "internal surface" and "internal surface area" mean the surface area of a particle formed by voids not perceptible to the naked eye, said voids having diameters on the order of angstroms. The internal surface area is measured on a microscopic or molecular level and includes the surface area of micropores within the structure of the molecular seive molecules and macropores formed between the molecules.

DETAILED DESCRIPTION

Figure 1:
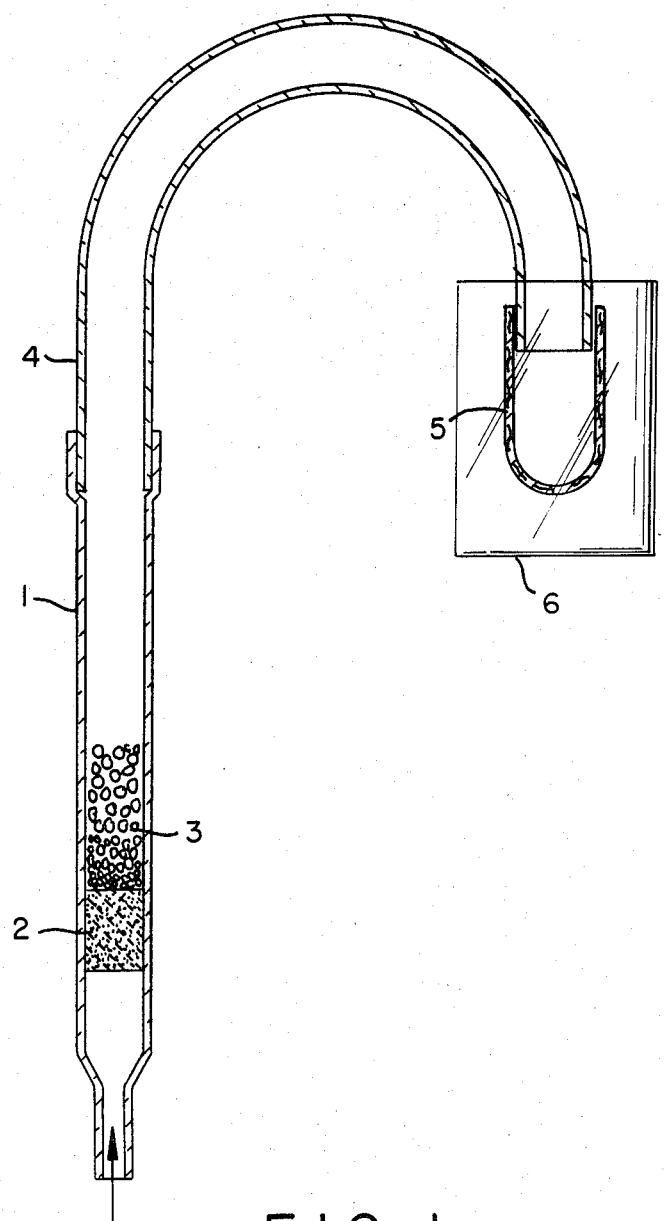
FIG. 1 is a representation of the apparatus used to evaluate several embodiments of the composition of this invention for attrition resistance.

Molecular sieves are known in the art by various means such as crystalline aluminosilicates and crystalline zeolites; they generally refer to a class of hydrated metal aluminosilicates having a crystalline structure composed of an assembly of silicon and aluminum atoms yielding a precisely defined pore structure. The basic formula for crystalline zeolites may be represented as follows:

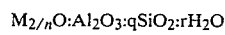

$$M_{2/n}O:Al_2O_3:qSiO_2:rH_2O$$

where "M" represents a metal cation, "n" its valence and q and r are coefficients. The various zeolites are distinguished by their silica-to-alumina ratio (i.e., the value of q) and by the exchangeable cation (M) present in the pore structure. Zeolites may be naturally occurring such as arionite, clinoptilolite, faujasite and mordenite or they may be man-made such as zeolite A, zeolite X and zeolite Y. Those skilled in the art are familar with the specific chemical formula for these and the other known zeolites.

Generally, synthetic molecular sieve crystals are commercially available in ultrafine powder form in a size range of from about 0.02 to 0.8 mil (0.5 to 20 microns). Generally spherical molecular sieve particles useful in this invention may be prepared by pressing or extruding the molecular sieve crystals in power form with a binder which is generally a clay material such as halloysite dealkalized bentonite, ball clay and koalin as described in U.S. Pat. No. 3,219,590-Ribaud. Generally spherical molecular sieve particles useful in this invention may also be prepared by the "in situ" crystallization or conversion of a preformed clay particle to zeolite material as described in Breck, D. W., *Zeolite Molecular Sieves,* John Wiley & Sons, New York, 1974, pages 725-755. Those skilled in the art may be aware of other methods to obtain generally spherical molecular sieve particles useful in this invention.

The generally spherical molecular sieve particles useful in this invention may have any useful and effective particle size which, as is known to those in the art, will be determined in part by such parameters as the density of the particles, the fluidization medium and the desired fluidization conditions. Typically, particle sizes are less than about 0.25 inch (0.64 centimeter).

The molecular sieve particles useful in this invention have a high porosity, i.e., possess an internal surface area greater than about 300 square meters per gram. The porosity of particles may be determined by a number of techniques known to those skilled in the art such as described in Gregg and Sing, *Adsorption Surface Area in Porosity,* Academic Press, 1967, New York, page 49 etc. or Young and Crowell, *Physical Adsorption of Gases,* Butterworth and Co., Ltd., 1962, Washington, page 182 etc. The micropores, those pores whose diameters are from about 1 to 1000 angstroms, provide the requisite area for activity such as adsorption or catalysis, while the macropores, generally those pores having diameters greater than about 1000 angstroms, insure that there is sufficient surface porosity to provide a strong bond between the particle and the solid lubricant. Typically, micropores having a diameter under about 20 angstroms may account for about 95 percent of the total internal surface area of a given sample of molecular sieve.

High internal strength or crush strength of the molecular seive particle is not relevant to its surface attrition resistance or its suitability for use with the invention. Very hard molecular sieve particles, such as those employing a high binder content and/or structural fibers, are still susceptible to surface attrition upon particle to particle or particle to apparatus contact and would benefit from the practice of this invention.

The generally spherical, high porosity molecular sieve particles useful in this invention are coated on their exposed surface by a thin, generally uniform layer of solid lubricant. The lubricant may be any solid lubricant which is chemically stable in the intended use, which behaves as a lubricant over the entire operating range of the moving or fluidized bed system and which does not significantly affect the activity of the molecular sieve particles. Among the solid lubricants useful in this invention one can name graphitic carbon powder, particulate graphite, molybdenum disulfide, polytetrafluoroethylene powder, tungsten disulfide, lead sulfide, titanium sulfide, aluminum stearate, calcium stearate, magnesium stearate, molybdenum telluride, tungsten telluride, titanium telluride, molybdenum selenide, niobium diselenide, lead oxide, antimony trioxide, calcium fluoride-barium fluoride eutectic, and combinations thereof.

The lubricant coating is applied to the exposed surface of the molecular sieve particles in a thin, generally uniform layer. The lubricant is applied to the molecular sieve particle in an amount of from about $1.0 \times 10^{-7}$ to $2.0 \times 10^{-3}$ gram per square centimeter of particle projected surface area, preferably from about $1.0 \times 10^{-7}$ to $1.0 \times 10^{-3}$ gram per square centimeter, most preferably from about $1.0 \times 10^{-7}$ to $3.0 \times 10^{-4}$ gram per square centimeter. Below about $1.0 \times 10^{-7}$ grams per square centimeter the lubricant may not be present in an amount to effectively reduce attrition, while above $2.0 \times 10^{-3}$ grams per square centimeter the lubricant may tend to impair the activity of the molecular sieve particle and also may be itself easily attrited during the operation of the moving or fluidized bed. Although it may be desirable to apply the coating in an amount only slightly greater than the least amount shown to be effective, because the coating does eventually wear off, it may therefore become a matter of practicality to coat the particles with somewhat more than the minimum required, without exceeding the maximum determined by mass transfer considerations or by the ability to hold the coating, so that the particles need not be frequently removed from the bed for recoating.

Figure 4:
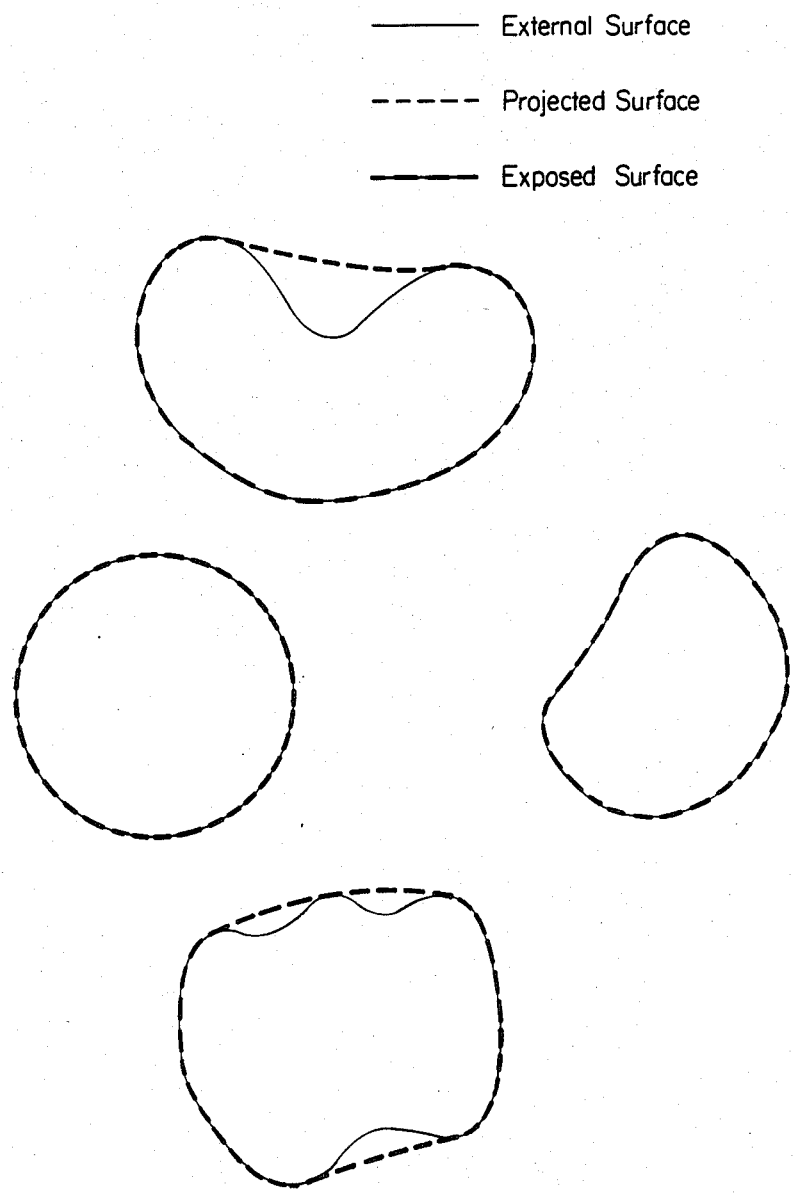
FIG. 4 is a stylistic representation of a cross section of four molecular sieve particles illustrating the external surface, the projected surface and the exposed surface of each particle.

For a clearer understanding of what is meant by external surface, projected surface and exposed surface, reference is made to FIG. 4 which represents stylistically four molecular sieve shapes in cross-section or in two dimensions. The external surface is that surface which is apparent to the naked eye and is represented in FIG. 4 by the solid line. The projected surface is the "smoothed out" external surface and is represented in FIG. 4 by the dashed line. The exposed surface is the surface upon which the coating is applied and is the surface which is essentially coincidental to the external and projected surfaces. The exposed surface is represented in FIG. 4 by the combination of thin solid and heavy dashed line. Although this invention comprises the coating of the exposed surface, one may also coat the external surface which is not coincidental with the projected surface. However such coating is not necessary to achieve the beneficial results obtained.

The solid lubricant may be applied to the exposed surface of the molecular sieve particles in any effective manner which will not result in the deposition of lubricant in significant amounts in the internal pore structure, i.e. on the internal surface, of the porous particles. One method of effectively applying the solid lubricant coating to the molecular sieve particle exposed surface is rolling the porous sieve particles in a drum or other roll mill means containing an appropriate weight of the lubricant, preferably in powder form. Another method of effectively applying the solid lubricant coating to the molecular sieve particle exposed surface is to continuously apply the lubricant to the particles within the moving or fluidized bed. Such in situ coating is possible, for example, by mixing the porous particles with a lubricant-supplying pellet, such as beaded activated carbon, i.e. BAC, which slowly erodes and concomitantly coats the porous particles with a lubricant layer during operation of the bed. It is believed that when beaded activated carbon is used to apply the coating in such in situ case, the solid lubricant applied is graphite derived from the partially graphitic structure of this type of activated carbon.

Another method of coating particles with solid lubricant may be to apply a liquid suspension of the solid lubricant to the particles, e.g. by spraying, and subsequently dry them. Of course, the coating must not be applied in a way that destroys the structural or mass transfer integrity of the particle.

The present invention comprises the surprising discovery that a thin lubricant coating on the exposed surface of a generally spherical, high porosity molecular sieve particle will significantly reduce attrition even when the particle is employed in moving or fluidized bed conditions. It is surprising that the thin lubricant coating is effective and also stable, i.e. adherent, under the violent conditions in moving and fluidized beds. Were a thick layer of lubricant required to provide the requisite attrition resistance, the resulting imposition of high mass transfer resistance would adversely affect the activity of the molecular sieve particles. Were the thin layer of lubricant not stable, i.e. adherent, under moving or fluidized bed conditions, then high lubricant attrition would merely replace high particle attrition resulting in problems similar to those encountered when uncoated friable molecular sieve particles are used in moving or fluidized beds. While not wishing to be bound by any theory, applicants believe that this serendipitous bonding characteristic is, in significant degree, due to microscopic surface irregularities which are inherent in high porosity molecular sieve particles. Because of these surface irregularities, the bond between the lubricant and the porous molecular seive substrate occurs over a larger area than would be the case for a microscopically smooth substrate. This larger contact area results in a larger bonding force thus allowing the use of a thin coating of lubricant to provide the requisite attrition resistance.

Although the attrition problem is not as severe in fixed beds as it is in moving beds, the present invention still provides several advantages. Total adsorbent inventory will not need to be supplemented and/or replaced as often as uncoated adsorbent, leading to a direct monetary savings. The coating will also improve the packing of particles in the bed. Total bed volume for a given weight of adsorbent is reduced by having fewer dead or void spaces in the bed.

The coated, generally spherical, high porosity molecular sieve particles of this invention may be advantageously employed in a great many processes wherein material is chemically or physically altered by passage through an adsorbent bed, such as in adsorption and catalysis. Such processes also include drying, bulk separation of gases, vapors or liquids, and gas or liquid purification. Specific examples of such applications include fluidized catalytic cracking of oil to produce gasoline, removing carbon dioxide from air, removing water from compressed air, increasing the percentage of hydrogen in a waste stream, isomer separation, removing hydrocarbon solvents from air exhausted from paint booths or dry cleaning booths, bulk removal of reactants from plant streams with subsequent recycle, removal of trace contaminants from chemical plant vent streams, and producing oxygen by separating it from nitrogen in air.

In addition to achieving increased attrition resistance for molecular sieves while not subjecting the sieves to lower activity, the present invention has a number of other advantages when used in moving or fluidized beds. For example, because the coated molecular sieve particles are less constrained by friction than uncoated particles, the rate of circulation, or material flow rate, within the bed is improved. This enhances interaction of the particles with the fluid. Moving and fluidized beds employing coated bed particles exhibit less wear on bed internals and auxiliary equipment, such as seals, so that system life and reliability are improved. This reduction in abrasion due to the reduction in frictional forces is attributable to the lubrication imparted by the coated particles to the system parts as well as to the coating on the particles themselves. Furthermore, less pressure is required to transport the materials, for example in an entrained bed, because of the lubrication, so the system energy consumption is reduced. It is expected that these advantages would be achieved by virtually any gas-solid system using lubricant coated particles, regardless of whether or not attrition of the particle is reduced by using the lubricant.

The following examples serve to further illustrate the present invention. They are not intended to limit the present invention in any way.

EXAMPLE 1

Embodiments of the composition of this invention were evaluated using the test apparatus shown in FIG. 1. Referring now to FIG. 1, the fluidized bed test apparatus comprises a 1-inch diameter glass tube 1 having an overall length of about 15 inches (38 centimeters). A porous ceramic plug 2 in the bottom of tube 1 serves as a gas distributor. The composition 3 to be tested is supported on ceramic plug 2 at an unfluidized height of about 2 inches (5 centimeters). A glass U-tube 4 is connected to the top of tube 1 and a very fine porosity paper thimble or filter 5, encased within a polyethylene bag 6, is connected to the other end of tube 4. Bag 6 is attached in a way that allows the fluidizing gas to be quiescently vented from the apparatus and is used to hermetically enclose filter 5 prior to mass measurements to retard weight gain caused by the adsorption of atmospheric moisture.

An embodiment of the composition of this invention was prepared by blending commercially available 13X molecular sieves which were generally spherical $4 \times 8$ mesh size, (all mesh sizes referred to herein are with reference to ASTM-11) and 325 mesh graphite powder having a particle size less than 0.0017 inch (43 microns) and rolling the blended mixture in a drum for about 16 hours to obtain molecular sieve particles having their exposed surface coated with a thin, generally uniform film of solid lubricant in an amount of about 0.154 weight percent based on the weight of the uncoated partice or about $1.81 \times 10^{-4}$ gram per square centimeter of particle projected surface area. The calculation from weight percent to weight per unit projected surface area is made assuming the particles are perfect spheres and an even distribution of particle size. The coated particles were placed in the test apparatus and dry nitrogen gas was introduced into the bottom of tube 1 to fluidize the bed at an expansion ratio of about 2.25 and a relative fluidization velocity of 1.50. The expansion ratio is the ratio of fluidized bed volume to unfluidized bed volume. Because of the transient nature of the fluidized bed height, the expansion ratio is taken as the time-average of the above-named volumes. The relative fluidization velocity is the ratio of the fluidizing gas velocity to the minimum velocity required to fluidize the bed. The evaluation was conducted for four weeks during which the dust produced by attrition of the particles in the bed was collected in filter 5. After this time the dust was weighed by subtracting the pre-test weight of the filter from the post-test weight and the percent yearly weight loss of the particles was calculated by multiplying the four week percent loss by 13. The compositions of this invention exhibited a yearly weight loss of only 0.86 percent.

For comparative purposes a procedure similar to that described above was carried out without coating the 13X molecular sieve particles. In this comparative example the bed expansion ratio was about 2.19 and the relative fluidization velocity was 1.50. The uncoated particles exhibited a yearly weight loss of 41.25 percent.

This example clearly demonstrates that the compositions of this invention are much more attrition resistant than uncoated commercially available molecular sieves. In this example the attrition of the uncoated sieve particles was fifty times that of the sieve particles of this invention.

EXAMPLE 2

Using the apparatus described in Example 1 a procedure similar to that of Example 1 was repeated five times using either $8 \times 12$ mesh 13X, $16 \times 40$ mesh 13X, or $16 \times 40$ mesh 4A molecular sieves. The amount of coating on the exposed surface of the particles is reported in gram per square centimeter of particle projected surface area. The results are shown in Table I.

For comparative purposes a procedure similar to that of Example 1 was repeated four times but without coating the particles. These results are also reported in Table I.

TABLE I

| Molecular Sieve (size/type) | Coating (wt. %) | Coating (gm/cm$^2$) | Expansion Ratio | Rel. Fluidization Velocity | Yearly Loss (wt %) |
|---|---|---|---|---|---|
| $8 \times 12$, 13X | 0.038 | $2.57 \times 10^{-5}$ | 1.21 | 1.53 | 0.32 |
| $16 \times 40$, 13X | 0.154 | $4.13 \times 10^{-5}$ | 1.51 | 1.66 | 0.28 |

TABLE I-continued

| Molecular Sieve (size/type) | Coating (wt. %) | Coating (gm/cm²) | Expansion Ratio | Rel. Fluidization Velocity | Yearly Loss (wt %) |
|---|---|---|---|---|---|
| 16 × 40, 13X | 0.154 | 4.13 × 10⁻⁵ | 1.87 | 2.01 | 0.75 |
| 16 × 40, 4A | 0.150 | 1.37 × 10⁻⁴ | 1.23 | 1.51 | 0.95 |
| 16 × 40, 4A | 0.150 | 1.37 × 10⁻⁴ | 1.47 | 1.84 | 3.62 |
| 16 × 40, 13X | — | none | 1.09 | 1.30 | 8.28 |
| 16 × 40, 13X | — | none | 1.77 | 6.23 | 54.5 |
| 16 × 40, 13X | — | none | 2.83 | 13.78 | 68.15 |
| 16 × 40, 13X | — | none | 3.64 | 19.90 | 89.62 |

This example again clearly demonstrates the superior attrition resistance of the compositions of this invention over that exhibited by commercially available molecular sieves.

EXPERIMENT A

Using the apparatus described in Example 1, a procedure similar to that of Example 1 was carried out using alumina silicate from Union Carbide Corporation in place of the 13X molecular sieves used in Example 1. The alumina silicate particles had diameters of one-eighth inch or less and were granular, i.e., they were not generally spherical. One evaluation was carried out with uncoated particles at an expansion ratio of about 1.24 and a relative fluidization velocity of 2.46. The uncoated particles exhibited a yearly weight loss of 30.77 percent. Another evaluation was carried out using alumina silicate particles which had been coated with about 1.499 weight percent of graphite powder or about $1.59 \times 10^{-3}$ gram per square centimeter of projected surface area using a procedure similar to that described in Example 1. The expansion ratio was about 1.17, the relative fluidization velocity was 2.78 and the yearly weight loss was 71.7 weight percent. This experiment indicates that the process of this invention to increase the attrition resistance of generally spherical molecular sieves is not effective on granular alumina silicate.

EXPERIMENT B

Using the apparatus described in Example 1, a procedure similar to that of Example 1 was carried out using gradually spherical alumina A201 particles having a mesh size of 5×8 in place of the 13X molecular sieves used in Example 1. Alumina A201 is a well known adsorbent. One evaluation was carried out with uncoated particles at an expansion ratio of about 1.31 and a relative fluidization velocity of 1.34. The uncoated particles exhibited a yearly weight loss of 158.26 percent. Another evaluation was carried out using alumina A201 particles which had been coated with 0.154 weight percent of graphite powder or about $1.64 \times 10^{-4}$ gram per square centimeter of projected surface area using a procedure similar to that described in Example 1. The expansion ratio was about 1.64, the relative fluidization velocity was 1.62 and the yearly weight loss was 624.13 percent. This experiment indicates that the process of this invention to increase the attrition resistance of molecular sieves is not effective on all adsorbents.

EXPERIMENT C

Using the apparatus described in Example 1, a procedure similar to that of Example 1 was carried out using granular quartz sand particles having a 20×30 mesh size in place of the 13X molecular sieves used in Example 1. Quartz sand is hard and essentially non-friable. One evaluation was carried out with uncoated particles at an expansion ratio of about 1.52 and a relative fluidization velocity of 1.39. The uncoated particles exhibited a yearly weight loss of 0.96 percent. Another evaluation was carried out using quartz sand particles which had been coated with 0.308 weight percent of graphite powder or about $7.37 \times 10^{-5}$ gram per square centimeter of projected surface area using a procedure similar to that described in Example 1. The expansion ratio was about 1.46, the relative fluidization velocity was 1.27 and the yearly weight loss was 2.20 percent. This experiment indicates that the process of this invention to increase the attrition resistance of generally spherical, friable molecular sieves does not increase the attrition resistance of material that is non-friable and granular.

EXAMPLE 3

Using the apparatus described in Example 1, a procedure similar to that of Example 1 was carried out twice using 20×35 mesh 13X molecular sieves but employing 325 mesh molybdenum disulfide and polytetrafluoroethylene powder respectively as the solid lubricant coating in place of the graphite powder used in Example 1. The amount of coating on the exposed surface of the particles is reported in gram per square centimer of particle projected surface area. The results, which are shown in Table II demonstrate that solid lubricants other than graphite are effective for use in the process and composition of this invention.

TABLE II

| Coating | Wt. % | gram/cm² | Expansion Ratio | Rel. Fluidization Velocity | Yearly loss (Wt. %) |
|---|---|---|---|---|---|
| Molybdenum Disulfide | 0.065 | 1.45 × 10⁻⁵ | 1.23 | 1.56 | 1.06 |
| Polytetrafluroethylene | 0.154 | 3.44 × 10⁻⁵ | 1.50 | 1.48 | 0.68 |

EXAMPLE 4

Using the apparatus described in Example 1, a procedure similar to that of Example 1 was carried out four times using 20×35 mesh 13X molecular sieve particles. However, in this Example 4 the sieve particles were not coated by rolling with solid lubricant particles in a drum. Instead the sieve particles were mixed with solid lubricant particles and the mixture was used as the bed such that the sieve particles were coated in situ by material eroded from the lubricant particles as the process was carried out. In each of the four runs of this Example 4 the solid lubricant employed was 20×35 mesh spherical activated carbon. In Run A the bed mixture comprised 5 weight percent lubricant and 95 weight percent sieve particles. In Run B the lubricant concentration in the mixture was 10 weight percent, in Run C it was 25 weight percent and in Run D it was 50 weight percent.

In order to verify that the molecular sieve particles were being effectively coated in situ and that the process was leading to the low attrition observed in Runs A–D, the sieve material used in run B was separated from the mixture and used in an evaluation using a test procedure similar to that of Example 1. The results of this evaluation are reported in Table III as Run E.

The results shown in Table III demonstrate that solid lubricant can be coated onto molecular sieve particles in a moving or fluidized bed in order to attain attrition resistant molecular sieve compositions of this invention.

TABLE III

| Run | Composition (wt. %) Act. Car., Sieve | Expansion Ratio | Rel. Fluidization Velocity | Yearly Loss (wt. %) |
|---|---|---|---|---|
| A | 5,95 | 1.53 | 1.99 | 0.27 |
| B | 10,90 | 1.21 | 1.89 | 0.47 |
| C | 25,75 | 1.46 | 2.15 | 0.58 |
| D | 50,50 | 1.43 | 1.88 | 0.69 |
| E | — | 1.17 | 1.45 | 0.02 |

EXAMPLE 5

Three embodiments of the composition of this invention were prepared. Embodiment A was prepared by coating 20×35 mesh 13X molecular sieve particles with 325 mesh graphite powder following a procedure similar to that of Example 1. The thin, generally uniform coating was applied to the exposed surface in an amount of about 0.154 weight percent of the particle or about $3.44 \times 10^{-5}$ gram per square centimeter of projected surface area. Embodiment B was prepared by coating 20×35 mesh 13X molecular sieve particles with 325 mesh molybdenum disulfide following a procedure similar to that of Example 1 such that each particle had a thin, generally uniform exposed surface coating of about 0.152 weight percent of the particle or about $3.40 \times 10^{-5}$ gram per square centimeter of projected surface area. Embodiment C was prepared by the in situ coating of 20×35 mesh 13X molecular sieve particles with 20×35 mesh spherical activated carbon following a procedure similar to that of Example 4. The in situ bed mixture comprised 90 weight percent sieve particles and 10 weight percent activated carbon.

Each embodiment was preliminarily activated by initial evacuation at ambient temperature followed by continuous evacuation while heating to about 350° C. and continued additional evacuation for about 8 hours at the elevated temperature. After such activation each embodiment was cooled and tested for nitrogen and carbon dioxide adsorption characteristics by passing the gas through the bed. A Sartorius pressure microbalance system was used to obtain the data.

The test for the adsorption of nitrogen was carried out at 22° C. and 1189 torr. The results are represented graphically in FIG. 2. For comparative purposes the adsorption characteristics of uncoated 20×35 mesh 13X molecular sieve particles were also evaluated following the same procedure and these results are also reported in FIG. 2.

The test for the adsorption of carbon dioxide was carried out at 22° C. and 10 torr. The results are represented graphically in FIG. 3. The results for embodiment C are not reported because equipment malfunction resulted in unrepresentative and unreliable data. For comparative purposes the adsorption characteristics of uncoated 20×35 mesh 13X molecular sieve particles were also evaluated following the same procedure and these results are also reported in FIG. 3.

Figure 2:
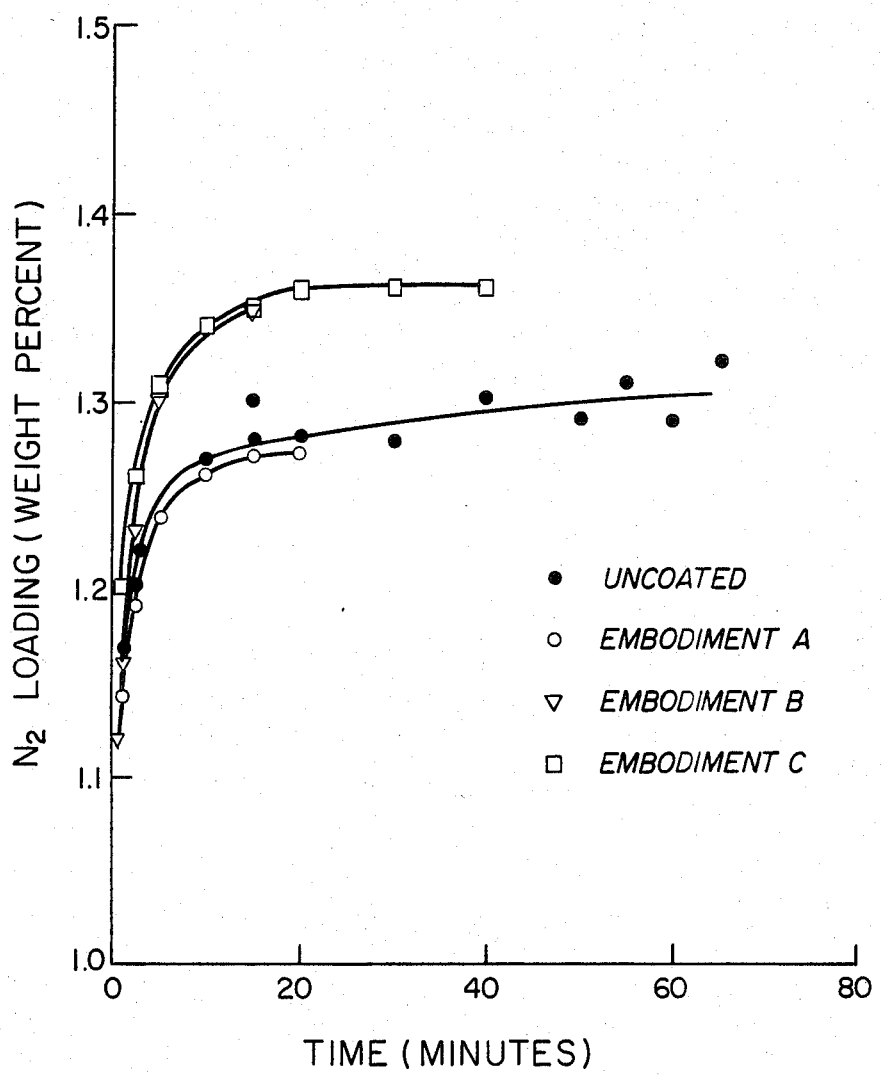
FIG. 2 is a graph representing the results of nitrogen adsorption characteristics in tests of Example 5.
Figure 3:
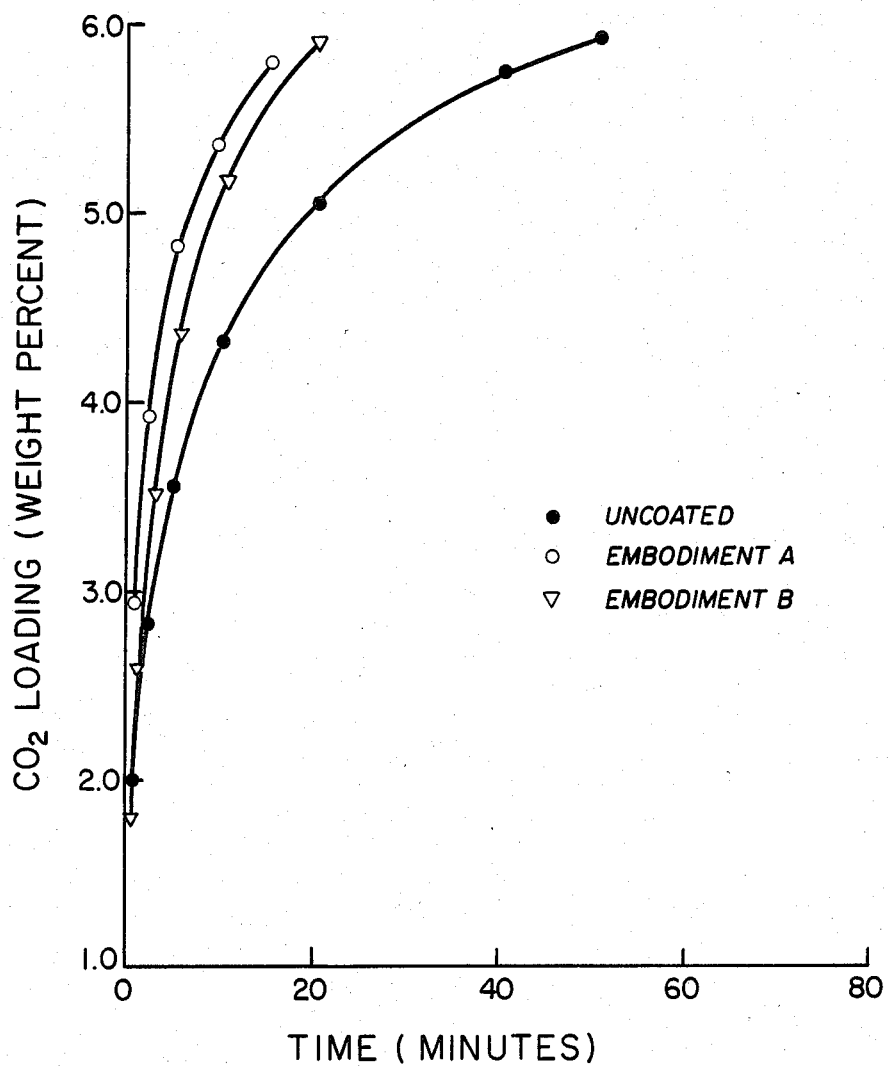
FIG. 3 is a graph representing the results of carbon dioxide adsorption characteristics in tests of Example 5.

As can be seen from FIGS. 2 and 3, the composition of this invention exhibits comparable or superior activity to uncoated molecular sieve particles. Thus, the composition of this invention retains the advantageous activity of commercially available molecular sieves while increasing the attrition resistance of molecular sieves to a significant degree. Such an increase in attrition resistance without a decrease in activity is completely unexpected.

Now by the use of the composition and process of this invention one can easily and efficiently employ molecular sieves in a fixed bed process as well as a moving or fluidized bed process while avoiding high maintenance costs due to attrition and without suffering a significant loss in bed activity.

We claim:

1. A composition comprising a generally spherical, friable, high porosity molecular sieve particle, having an adherent surface comprising surface irregularities and, adhered to the exposed adherent surface of said particle, a thin, generally uniform coating of a solid lubricant in an amount of from about $1.0 \times 10^{-7}$ to $2.0 \times 10^{-3}$ gram per square centimeter of the projected surface area of said particle.

2. The composition of claim 1 wherein said amount is from about $1.0 \times 10^{-7}$ to $1.0 \times 10^{-3}$ gram per square centimeter.

3. The composition of claim 1 wherein said amount is from $1.0 \times 10^{-7}$ to $3.0 \times 10^{-4}$ gram per square centimeter.

4. The composition of claim 1 wherein said molecular sieve particle comprises 13X molecular sieve.

5. The composition of claim 1 wherein said molecular sieve particle comprises 4A molecular sieve.

6. The composition of claim 1 wherein said solid lubricant is graphite.

7. The composition of claim 1 wherein said solid lubricant is molybdenum disulfide.

8. The composition of claim 1 wherein said solid lubricant is polytetrafluoroethylene.

9. The composition of claim 1 wherein said solid lubricant is derived from activated carbon.

10. A process for rendering a generally spherical, high porosity, friable molecular sieve particle having an adherent surface comprising surface irregularities more resistant to attrition comprising applying a dry lubricant to the exposed surface of said particle to adhere to said exposed surface a thin, generally uniform layer of solid lubricant in an amount of from about $1.0 \times 10^{-7}$ to $2.0 \times 10^{-3}$ gram per square centimeter of the projected surface area of said particle.

11. The process of claim 10 wherein said amount is from $1.0 \times 10^{-7}$ to $1.0 \times 10^{-3}$ gram per square centimeter.

12. The process of claim 10 wherein said amount is from $1.0 \times 10^{-7}$ to $3.0 \times 10^{-4}$ gram per square centimeter.

13. The process of claim 10 wherein said molecular sieve particle comprises 13X molecular sieve.

14. The process of claim 10 wherein said molecular sieve particle comprises 4A molecular sieve.

15. The process of claim 10 wherein said solid lubricant is graphite.

16. The process of claim 10 wherein said solid lubricant is molybdenum disulfide.

17. The process of claim 10 wherein said solid lubricant is polytetrafluoroethylene.

18. The process of claim 10 wherein said layer is applied by combining sieve particles and solid lubricant in roll mill means and rolling the resulting mixture.

19. The process of claim 10 wherein said layer is applied by combining sieve particles and solid lubricant in a bed and operating the bed in a moving or fluidized condition.

20. The process of claim 19 wherein the solid lubricant is in pellet form.

21. The process of claim 20 wherein the pellet comprises beaded activated carbon.

* * * * *